United States Patent
Fleenor et al.

(10) Patent No.: US 6,550,979 B1
(45) Date of Patent: Apr. 22, 2003

(54) FLOATING CONNECTOR SUBASSEMBLY AND CONNECTOR INCLUDING SAME

(75) Inventors: Paul A. Fleenor, Hickory, NC (US); Thomas Theuerkorn, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/999,875

(22) Filed: Oct. 19, 2001

(51) Int. Cl.[7] .............................. G02B 6/36; G02B 6/00
(52) U.S. Cl. .............................. 385/78; 385/76; 385/77; 385/139
(58) Field of Search ............................... 385/76–78, 70, 385/72–73, 53, 58, 52, 139

(56) References Cited

U.S. PATENT DOCUMENTS

| | | | |
|---|---|---|---|
| 5,016,970 A | * | 5/1991 | Nagase et al. ................. 385/60 |
| 5,212,752 A | * | 5/1993 | Stephenson et al. .......... 385/78 |
| 5,216,733 A | * | 6/1993 | Nagase et al. ................. 385/60 |
| 5,245,683 A | * | 9/1993 | Belenkiy et al. .............. 385/72 |
| 5,481,634 A | * | 1/1996 | Anderson et al. ............. 385/76 |
| 5,579,425 A | | 11/1996 | Lampert et al. .............. 385/59 |
| 5,633,970 A | | 5/1997 | Olson et al. ................... 385/78 |
| 5,638,474 A | | 6/1997 | Lampert et al. .............. 385/78 |
| 5,809,192 A | * | 9/1998 | Manning et al. .............. 385/78 |
| 6,298,190 B2 | * | 10/2001 | Waldron et al. ............. 385/134 |
| 6,464,402 B1 | * | 10/2002 | Andrews et al. .............. 385/53 |
| 6,464,408 B1 | * | 10/2002 | Nolan ........................... 385/87 |
| 2002/0114584 A1 | * | 8/2002 | Dean et al. ................... 385/78 |

* cited by examiner

Primary Examiner—Robert H. Kim
Assistant Examiner—Thomas R Artman

(57) ABSTRACT

A connector subassembly and related connector that are configured to floatingly align and tune mated ferrules are disclosed. The connector subassembly includes a ferrule holder and a plug housing having an inner surface with slanted or sloped alignment features, such as, for example, a radially extending key. In an embodiment, the ferrule holder assembly is configured to hold the ferrule and has an outer surface defining a groove extending axially. The key is slidably disposed in the groove. The connector includes the ferrule holder, the plug housing, a spring element disposed within the plug housing and urging the ferrule holder in a direction axially toward the rearward opening, a crimp body attached to the plug housing so as to compress the spring element, a boot attached to the plug housing via the crimp body and disposed about a portion of an optical fiber, and a tube disposed about a section of the optical fiber and secured to the ferrule holder.

20 Claims, 5 Drawing Sheets

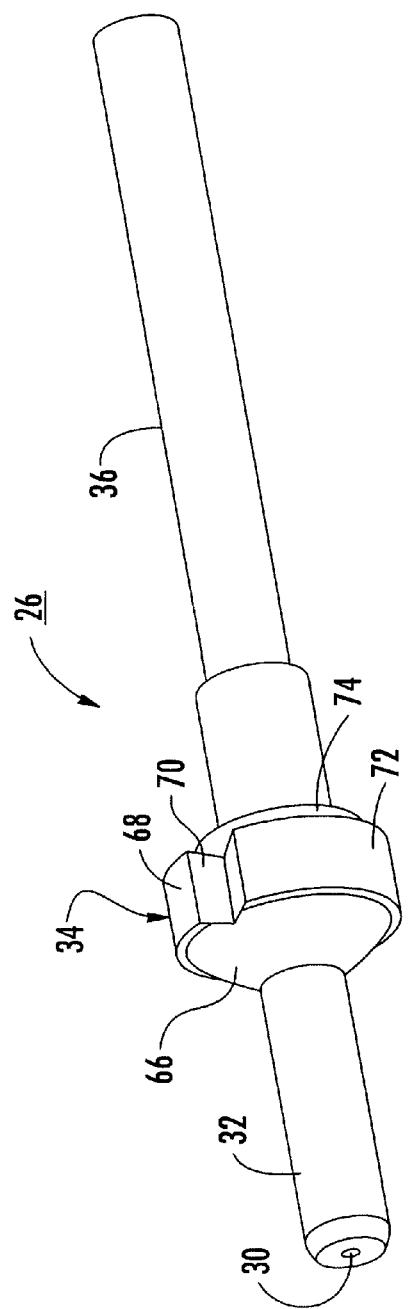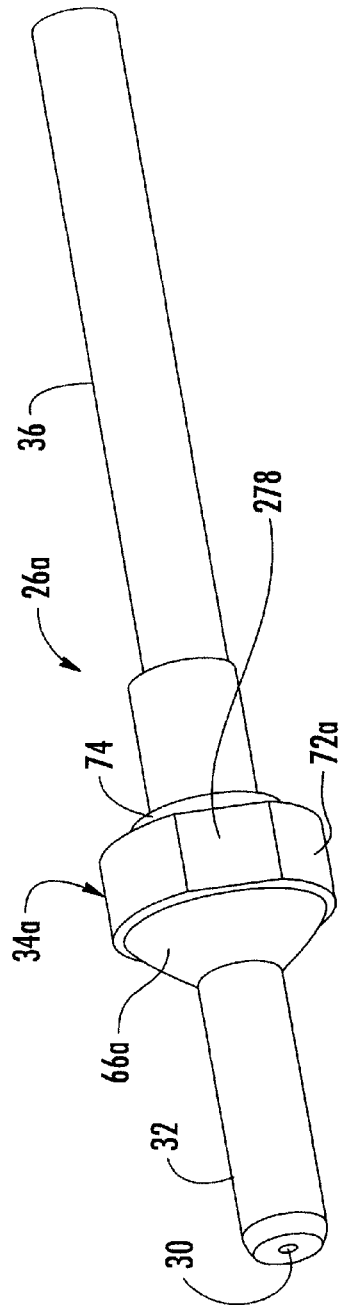

FLOATING CONNECTOR SUBASSEMBLY AND CONNECTOR INCLUDING SAME

FIELD OF THE INVENTION

The invention relates generally to floating connector subassemblies useful for optical cable connectors. More particularly, this invention relates to subassemblies and optical cable connectors that are configured to floatingly align and tune mated ferrules within the connectors. Even more particularly, this invention relates to a connector subassembly that includes a plug housing having an inner surface with slanted or sloped alignment features and a ferrule holder. The connectors may be used, for example, to join segments of optical cables and to connect an optical cable with an optical device, such as, for example, radiation sources, detectors, repeaters, switches, attenuators, and the like.

BACKGROUND OF THE INVENTION

Various types of connectors have been developed for connecting optical cables to optical system components, such as, for example, to join segments of optical cables and to connect an optical cable with an optical device, including, radiation sources, detectors, repeaters, switches, attenuators, and the like. Numerous factors influence the design of such connectors, including the diameter and makeup of the optical fiber used in the cable, the environment into which the cable and connector are placed, the space available for connection and the number of connections required in a given location, to name but a few. Standardized optical cable connector designs currently in common use include the SC-type, FC-type, ST-type, and RJ-type connectors.

Regardless of the optical cable connector design selected for a particular application, the central function of an optical cable connector is to maintain the optical fiber end in precise position relative to another fiber or another system component so as to maximize the signal strength as the light passes through the connection (i.e., minimize insertion losses). Even slight mispositioning of a fiber can contribute to insertion losses. In the past, industry had accepted some transmission loss due to misalignment. However, growing use of optical cables for communicating data demands near 100% transmission and reception capability and thus, minimal insertion loss. The degree of insertion loss in coupling two fibers is generally dependent on factors, such as, for example, the alignment of the fiber central axis at the ends, the width of the gap between the ends, and the optical surface condition of the ends.

To couple virtually all of the light from one fiber to another fiber is a particularly challenging task because the light carrying regions or "cores" of optical fibers are quite small. For example, in single mode optical fibers, the core diameter is about 8 microns. Thus, the very small end surface of the core must not only be precisely prepared, but must also be precisely located, both to tolerances in the range of fractions of microns, to achieve low insertion loss.

Another function of the optical cable connector is to provide mechanical stability and protection to the junction and its working environment. Stability and junction protection is generally a function of connector design. Bulkier designs may provide more stability, but may disadvantageously take up more space and cost more than other designs.

In a connection between a pair of optical fiber connectors, an optical fiber extending from a center of an end face of a ferrule is butted together with an end face of another ferrule and light travels from one optical fiber to the other along the central axes of the two optical fibers. One such arrangement using an LC connector is illustrated in U.S. Pat. No. 5,481,634.

Often, a "floating" arrangement is provided, wherein the two ferrules, once butted together, can float as a unit relative to the plug housings due to springs present in the plug housings. The butted ferrule ends are typically held in alignment by a sleeve covering both ends. Such floating arrangements are beneficial in that the ferrules can be joined together as an aligned unit without regard to any small misalignments or imperfections in the other connector elements. Thus, all connector elements need not be manufactured to extremely tight tolerances to achieve a well-aligned pair of ferrules and fibers, so long as the ferrules and certain alignment elements (e.g., the sleeve) are precisely manufactured and assembled.

Any radial eccentricity of a fiber within a ferrule (i.e., when a fiber's central axis is spaced from the ferrule's central axis) may be compensated for by "tuning" the ferrule by orienting the eccentricity in a given direction relative to its ferrule holder and/or plug housing. When the ferrule is connected to another ferrule, having both ferrules tuned in the same direction may reduce insertion loss by improving alignment if the fiber positioning within each of ferrules is within certain tolerances.

Some connectors use a straight (i.e., substantially rectangular, radially extending) key and groove feature to tune a ferrule relative to a plug housing. In such case, a substantially rectangular key extends from the plug housing into a substantially rectangular groove in a ferrule holder. Due to the substantially rectangular and radially extending complimentary shapes of the key and groove, the ferrule's ability to compensate for any misalignments between the ferrule and the plug housing inner surface is limited. Thus, by maintaining precise tuning and alignment of the ferrule relative to its plug housing, the ferrule has little if any ability to float. By loosening the fit of such a key structure, for example by making the key smaller or the groove bigger, the precision of the tuning and alignment of the ferrule relative to its plug housing suffer, potentially defeating the purpose of the key and groove. Thus, a trade off exists between the precision of the floating capability and the precision of the tuning and alignment capability in available connectors. At present, mating components of available tunable connectors typically have used relatively tight tolerances, which in turn reduces the ability of the ferrule to float. In addition, conventional connector designs fail to include means to further minimize or compensate for alignment errors and manufacturing inaccuracies that would otherwise result in insertion losses.

SUMMARY OF THE INVENTION

Accordingly, it is an objective of this invention to provide a connector subassembly and a related connector having a floating capability and a tuning and aligning capability, wherein the component parts of the connector subassembly and connector are simple, reliable, and economical to manufacture, assemble, and use. Other objectives and advantages of the invention will be apparent from the following description and the attached drawings, or can be learned through practice of the invention.

According to an aspect of the invention, a connector subassembly includes a plug housing and a ferrule holder that provide floating capability and tuning and alignment capability of a ferrule. The connector subassembly includes a plug housing having an inner surface that defines a cavity extending longitudinally therethrough. The plug housing defines a forward opening in communication with the cavity for receiving an optical fiber extending into a ferrule and a rearward opening in communication with the cavity and configured for the optical fiber and the ferrule to extend substantially axially. The plug housing inner surface further defines a key extending into the cavity. The key defines a height along the plug housing inner surface that extends in a radial direction and decreases in a direction axially away from the rearward opening. The ferrule holder includes an inner surface configured to hold the ferrule and an engaging surface configured to mate with and engage an engaging surface of the plug housing, wherein the engaging surface of the plug housing is at least a portion of the inner surface of the plug housing. The outer surface of the ferrule holder defines a longitudinally extending axial groove for slidably receiving the key so that the ferrule holder is increasingly radially movable relative to the inner surface of the plug housing as the ferrule holder moves relative to the plug housing in a direction axially away from the rearward opening.

The cavity of the plug housing includes a forward cavity in communication with the forward portion. The forward cavity may be substantially conical and may define a circular cross-section decreasing radially in a direction axially toward the rearward opening. The ferrule holder engaging surface is configured to mate with and engage the plug housing engaging surface and thus, at least a portion of a forward end of the outer surface of the ferrule holder may also be substantially conical and decrease radially in a direction axially toward a rearward end of the ferrule holder.

The ferrule holder may define a radially extending stop portion disposed proximate to the forward end of the outer surface of the ferrule holder, and the plug housing inner surface may define a complimentary stop portion, the groove extending axially across at least a portion of the ferrule holder stop portion.

The key may have a cross-section including a rounded tip. The groove may have a generally flared cross-section, which more particularly may be generally v-shaped. It is to be noted that the shapes of the key and the corresponding groove may be altered without losing the functionality of this invention. For example, the key may have a cross-section including a semi-circular, rounded, or rectangular tip, and the groove may have a corresponding matable cross-section. In addition, the key and groove combinations in the disclosed embodiments may be replaced by other connection means furnishing the same function.

The plug housing may optionally include at least two keys disposed circumferentially about the plug housing inner surface, and the ferrule holder may then include at least two grooves disposed about the ferrule holder engaging surface, each of the grooves slidably receiving a respective key. The at least two keys may be disposed nonsymmetrically circumferentially about the plug housing inner surface.

The plug housing inner surface may optionally include a planar aligning section and the outer surface of the ferrule holder may then include a planar aligning section, the planar aligning sections being engageable with each other. At least two planar aligning sections may be provided on each component.

A compression spring element may be disposed within the plug housing for urging the ferrule holder in a direction axially toward the rearward opening.

According to another aspect of the invention, the connector subassembly includes a plug housing having an inner surface with at least two orienting elements disposed thereon and a matable ferrule holder having an outer surface with at least two orienting elements disposed thereon. At least one of the orienting elements of the plug housing inner surface may include a second key, and at least another of the orienting elements of the ferrule holder may then include a second groove for slidably receiving the second key. Alternately or in addition, at least another of the orienting elements of the plug housing inner surface may include a planar aligning section, and at least another of the orienting elements of the outer surface of the ferrule holder may then include a planar aligning section engageable with the plug housing inner surface planar aligning section.

According to another aspect of the invention, a spring element is disposed within the plug housing and urges the ferrule holder in a direction axially toward the rearward opening. A crimp body is attached to the plug housing so as to compress the spring element. A boot is attached to the plug housing via the crimp body and is disposed about a portion of the optical fiber. In a preferred embodiment, the boot is a flexible boot; however, rigid boots may be used in alternate embodiments. The connector may also include a tube disposed about a section of the optical fiber and secured to the ferrule holder. It is to be noted that the arrangement of the spring element, crimp body, boot, and tube may be altered without losing the merit of this invention.

BRIEF DESCRIPTION OF THE DRAWINGS

The above and other aspects, advantages, and objectives of this invention and apparent from the detailed description below in combination with the drawings, in which:

FIG. 4 is a perspective view of one embodiment of a ferrule holder according to this invention;

FIG. 5 is a perspective view of another embodiment of a ferrule holder according to this invention;

DETAILED DESCRIPTION OF THE INVENTION

Figure 1:
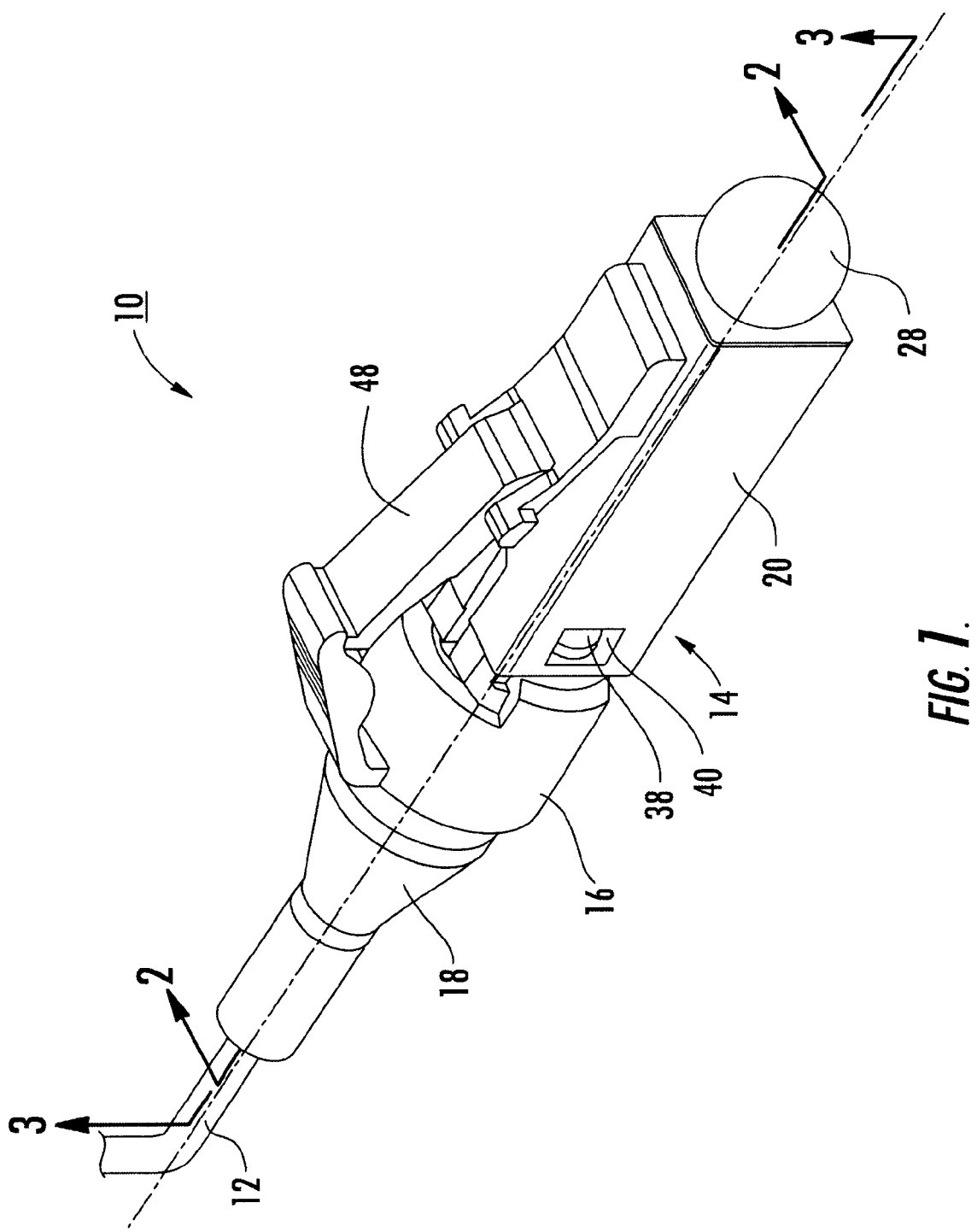
FIG. 1 is a perspective view of an exemplary embodiment of an optical cable connector according to an embodiment of this invention.

Detailed reference will now be made to the drawings in which examples embodying this invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and not meant as a limitation of the invention. This invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

Figure 2:
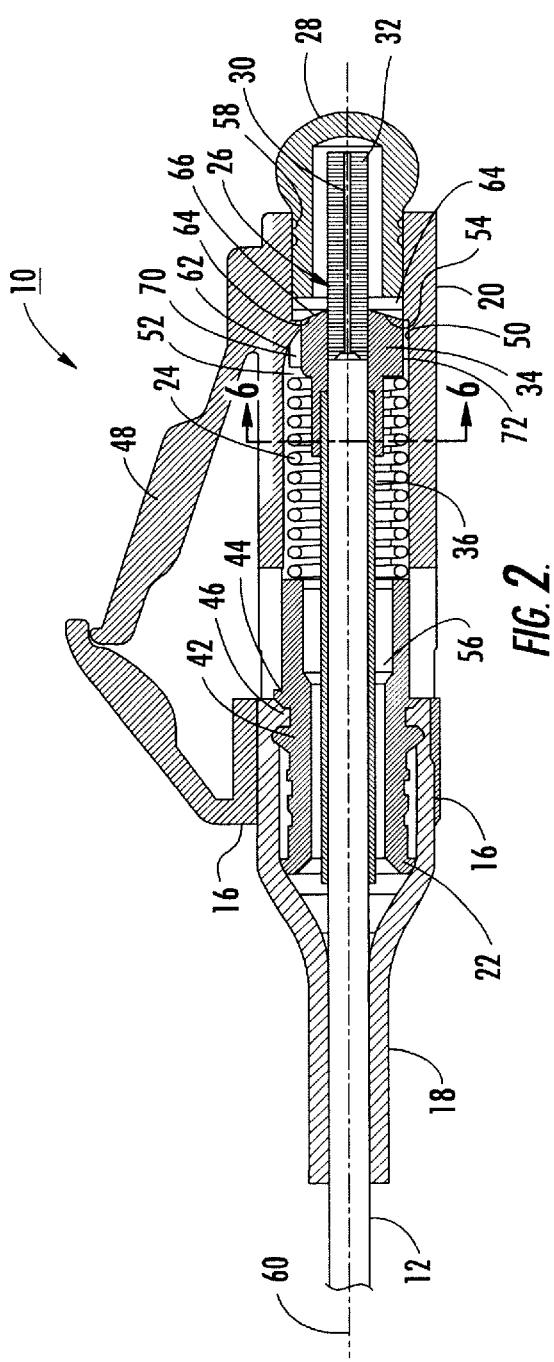
FIG. 2 is a sectional view of the optical cable connector of FIG. 1 taken along line II—II in FIG. 1 and also showing one embodiment of a connector subassembly according to an embodiment of this invention.
Figure 3:
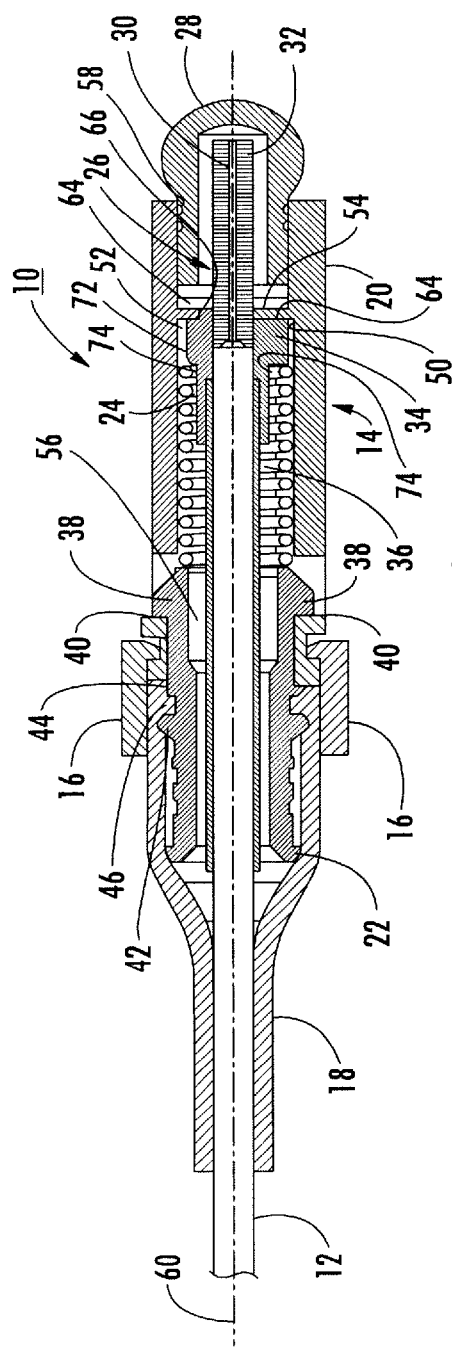
FIG. 3 is a sectional view of the optical cable connector of FIG. 1 taken along line III—III in FIG. 1.
Figure 6:
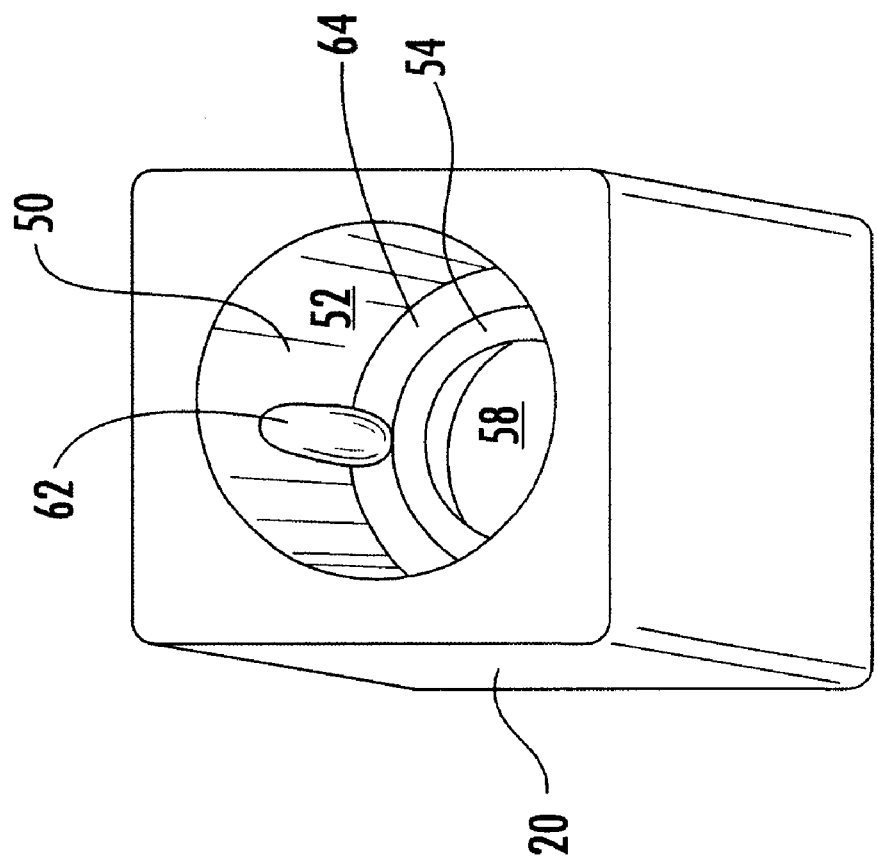
FIG. 6 is a sectional view of a portion of a one embodiment of a plug housing according to this invention and taken along line VI—VI in FIG. 2.

As embodied in FIGS. 1–3, a connector 10 for connecting an optical fiber cable 12 to a receptacle (not shown), such s another connector or optical device, is provided. As shown in the Figures, connector 10 forms a portion of a cable assembly with an LC connector attached at one end. While the Figures illustrate a portion of a preassembled cable assembly (an LC connector mounted on the end of an optical fiber), the floating connector subassembly, discussed in greater detail below, can be incorporated into previously assembled cable assemblies or utilized during the assembly of new cable assemblies. It should be understood that the following description of the disclosed embodiments is not intended to limit this invention to use only on such preassembled connectors or to LC connectors or to RJ-type connectors. Accordingly, this invention is suitable for use with various types of connectors, such as, for example, SC, DC, Unicam, LC, FC, ST, MTP, MU, MTRJ, and similar connectors.

With more particular reference to the Figures, connector 10 is attached to optical fiber cable 12. Connector 10 includes a connector subassembly 14, a trigger member 16, and a flexible boot 18. Trigger member 16 is optional and need not be used with connector subassembly 14 according to an embodiment of this invention. A detailed description of trigger member 16 is set forth in U.S. patent application Ser. No. 09/737,040, entitled "Trigger Mechanism, Optical Cable Connector Including Same, and Method of Assembling an Optical Cable Connector," filed Dec. 14, 2000, and is incorporated by reference herein.

Connector subassembly 14 includes a plug housing 20, a crimp body 22, a compression spring element 24, and a ferrule assembly 26. A dust cap 28, which is shown in U.S. Design patent application Ser. No. 29/127,591, incorporated by reference herein, is removably securable at a forward end of plug housing 20. An optical fiber 30 that extends out of cable 12 extends into a ferrule 32 of ferrule assembly 26. A ferrule holder 34 and a tube 36 also form part of ferrule assembly 26. Tabs 38 on crimp body 22 snap into openings 40 in plug housing 20 to secure the crimp body to the plug housing. Compression spring element 24 is compressed between crimp body 22 and ferrule holder 34 to provide floating performance, if desired. Interfering ridges 42, 44, and 46 matingly engage to securing boot 18 to crimp body 22, and to connector subassembly 14 in general. Trigger member 16 is attached to boot 18, if desired, using an interference fit so that the trigger member may interact with a latch 48 extending from plug housing 20, as set forth in U.S. patent application Ser. No. 09/737,040.

As shown in greater detail, for example, in FIGS. 2 and 3, plug housing 20 has an inner surface 50 defining a cavity 52 that extends axially within the plug housing. Inner surface 50 includes a plug housing engaging surface 54 for mating with and engaging an engaging surface 66 of ferrule holder 34, as will be described below. Plug housing 20 also includes a forward opening 56 in communication with cavity 52 for receiving optical fiber 30 and a rearward opening 58 in communication with the cavity through which the optical fiber and ferrule 32 extend substantially axially. For purposes herein, axially means along axis 60 (see FIGS. 2 and 3) and radially means outward from that axis.

Plug housing inner surface 50 includes a key 62 extending into cavity 52. Key 62 has a height in the radial direction (i.e., relative to axis 60) that decreases in a direction axially away from rearward opening 58 (i.e., to the left in FIG. 2). Key 62 is discussed in more detail below. Key 62 may have a cross-section including a flared tip (that is, decreasing in width in a radially inward direction) or more particularly a generally rounded tip, as shown best in FIG. 8.

Plug housing engaging surface 54 is located near rearward opening 58. Plug housing engaging surface 54 may be formed in a substantially conical shape, and may have a circular cross-section that decreases radially in a direction axially toward rearward opening 58 (that is, to the right in FIG. 2). Plug housing inner surface 50 may also include a stop portion 64 which may extend radially.

Ferrule holder 34 is configured to hold ferrule 32 and includes an engaging surface 66 that is engageable with plug housing engaging surface 54. Engaging surface 66 may be substantially conical for centering and matingly engaging plug housing engaging surface 54 if surface 54 is also conical. Other centering or mating shapes are also possible.

Figure 7:
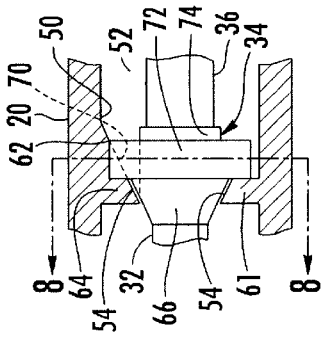
FIG. 7 is a partial sectional view of one example of an arrangement including a ferrule holder and a plug housing according to an embodiment of this invention.
Figure 9:
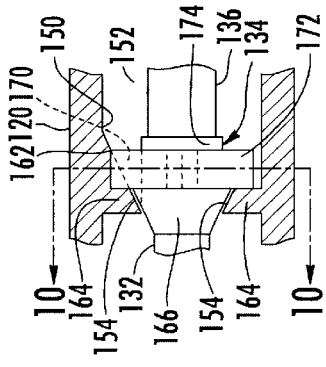
FIG. 9 is a partial sectional view of another arrangement including a ferrule holder and a plug housing according to an embodiment of this invention.
Figure 11:
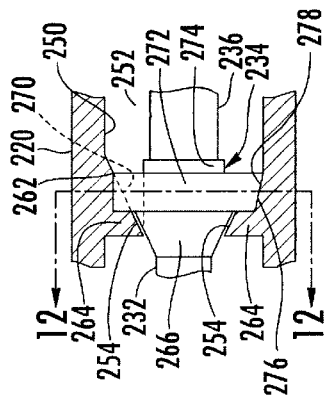
FIG. 11 is a partial sectional view of another arrangement including a ferrule holder and a plug housing according to an embodiment of this invention.

As shown in FIG. 4, ferrule holder 34 also includes an outer surface 68 defining a groove 70 extending axially for slidably receiving key 62. When assembled, ferrule holder 34 is increasingly radially moveable relative to plug housing inner surface 50 as the ferrule holder moves relative to plug housing 20 in a direction axially away from rearward opening 58. Thus, when the ferrule assembly 26 is pushed in that direction (to the left as shown in FIG. 2 or to the right as shown in FIGS. 7, 9, and 11), the radial length of the portion of key 62 disposed over a given point in groove 70 becomes smaller. The depth of groove 70 does not change, but the depth of extension into groove 70 of key 62 at a given point in the groove does change during such movement. The further the movement in the direction axially away from rearward opening 58, the more ferrule assembly 26 is radially moveable relative to plug housing 20. In other words, the further ferrule assembly 26 is pushed in, the more ferrule assembly 26 can float radially. Once compression spring element 24 is fully compressed, ferrule assembly 26 can no longer be pushed in any further and, thus, maximum float is achieved. If desired, a stop (not shown) may also be employed to limit ferrule assembly sliding.

Limitations on the extent of float are set by various factors, such as the amount of compression available by way of compression spring element 24, the force required to compress the compression spring element, the depth and shape of groove 70, the depth, shape, and axial length of key 62, and other connection elements. Thus, depending upon the size of the particular connector elements used (e.g., fiber 30, ferrule 32, plug housing 20, etc.), the sizes and shapes of the various elements described above can be modified from that shown herein to suit the particular application. Also, while this disclosure shows a ferrule used within an LC connector for a given cable size (900 micron), it should be understood that the invention has applications of various other types and sizes of connectors.

As shown in FIGS. 7, 9, and 11, ferrule holder 34 may include a radially-extending stop portion 72 disposed proximate ferrule holder engaging surface 66. Stop portion 72 of ferrule holder 34 matingly engages stop portion 64 of housing 20 when urged in that direction by compression spring element 24. A shoulder 74 may be provided on ferrule holder 34 for seating compression spring element 24.

Figure 8:
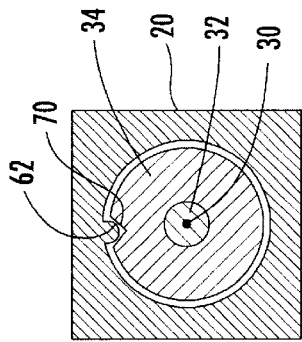
FIG. 8 is a partial sectional view of a portion of the ferrule holder and the plug housing taken along line VIII—VIII in FIG. 7.

As shown in FIGS. 4 and 8, groove 70 preferably has a generally flared cross-section (that is, an increasing width in a radially outward direction). More particularly, groove 70 may have a generally v-shaped cross-section. Use of a flared key and groove combination where the groove flares out wider than the key allows ferrule holder 34 to be increasingly radially moveable as it moves relative to housing 20 in a direction axially away from rearward opening 58, while also keeping frictional forces low and without causing tolerances to be high (for example, as compared to a substantially square groove and key). The rounded key and flared groove combination shown provides contact at only two points on the key and groove. A negligible amount of relative rotation between the ferrule and the plug housing is permitted, but not so much that the tuning or alignment are significantly impacted.

However, modifications of the depicted rounded key and v-shaped groove cross-section shapes are possible within the scope of the invention. For example, it would be possible to receive at least some of the benefits of the invention by providing a generally rectangular or otherwise non-flared groove in combination with a rounded or flared key. Alternately, it would be possible to change the cross-section of the key to a non-flared shape for use with a flared groove. Also, neither the key nor the groove could be radially flared, but the thickness of key or the groove (or both) could change in the axial direction. For example, a generally sloped rectangular shape key and corresponding groove would provide improved alignment. Thus, various modifications of the key and groove shapes are possible within the scope of the invention in order to provide radial floating while still achieving alignment of the optical fiber.

Figure 10:
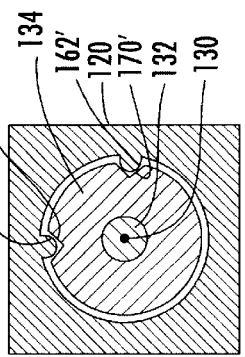
FIG. 10 is a partial sectional view of the ferrule holder and the plug housing

Another embodiment to the key and groove structure is set forth in FIGS. 9 and 10, which disclose a second embodiment of a plug housing and ferrule holder combination. In FIGS. 9 and 10, like reference numerals are intended to refer to like parts discussed above in connection with the first embodiment. As set forth in FIGS. 9 and 10, a second key 162' is provided in housing 120. Key 162' is circumfentially spaced from key 162 within housing inner surface 150. Groove 170' receives key 162' in the same fashion as groove 170 receives groove 162. Key 162' may have the configurations discussed above with regard to key 62, and groove 170' may have the configurations discussed above with regard to groove 70.

Although shown in FIG. 10 as identical, key 162' may differ slightly from key 162 if desired, and groove 170' may differ slightly from groove 170 if desired. Also, more than two key and groove combination may be provided if desired. Thus, three or more sets may be provided. The sets may be spaced as shown in FIG. 10 so that only one possible orientation allows keys 162 and 162' to fit into grooves 170 and 170'. Alternately, keys and grooves may be spaced symmetrically around the optical fiber so that multiple orientations are possible. If so, the greater the number of keys and grooves, the greater number of possible orientations of the optical fiber in relation to the plug housing. Thus, the optical fiber may be tunable in multiple orientations if multiple keys and grooves are spaced symmetrically.

As an additional option, the number of keys and grooves need not be identical. That is, more grooves may be provided than keys. Thus, for example, two or more grooves may be provided for use with a single key thereby effectively providing the floating capability shown in FIG. 8, as the key would be resident in only one of the various grooves. Generally, a greater number of grooves than keys could be used to provide such optional relative orientations. Thus, it should be understood that the number and location of keys and grooves may be modified in various ways within the scope of this invention.

Figure 12:
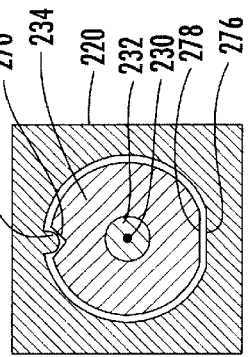
FIG. 12 is a partial sectional view of the ferrule holder and the plug housing taken along line XII—XII in FIG. 11.

Another embodiment of a plug housing and ferrule holder combination is set forth in FIGS. 11 and 12, and a perspective view of the ferrule assembly of that embodiment is also shown in FIG. 5. Again, like numerals are used to identify like parts. As shown in FIGS. 5, 11, and 12, housing engaging surface 254 may include a planar aligning surface 276, and ferrule holder engaging surface 266 may include a mating planar aligning surface 278. As oriented in FIG. 11, surfaces 276 and 278 slope upwardly to the left. When ferrule holder 234 is urged completely to the left so that stop portion 272 engages stop portion 264 of housing 220, aligning surfaces 276 and 278 also engage. Aligning surfaces 276 and 278 are spaced from each other slightly as shown in FIG. 12 when ferrule holder 234 is pushed inward to achieve floating orientation. Surfaces 276 and 278 thus provide an alternate form of tuning and aligning floating orientation. If desired, more than one set of aligning surfaces may be provided circumfentially around optical fiber 230.

The disclosed embodiments provide floating alignment and tuning of an optical fiber with relation to a plug housing, wherein the degree of float increases slightly as the ferrule assembly is pushed backward against the compression spring. Alignment is maintained with only negligible rotational play. The ferrule assembly may be selectively tunable relative to the plug housing. The connector can be plugged into various commonly available types of receptacles or joined to another connector while still providing the above benefits.

It will be apparent to those skilled in the art that various modifications and variations can be made in this invention without departing from the scope and spirit of the invention. It is to be noted that the shapes of the key and the corresponding groove may be altered without losing the functionality of this invention. For example, the key may have a cross-section including a semi-circular, rounded, or rectangular tip, and the groove may have a corresponding matable cross-section. In addition, the key and groove combinations in the disclosed embodiments may be replaced by other connection means furnishing the same function. Still further, specific shapes of various elements of the illustrated embodiments may be altered to suit particular connector or receptacle applications. Thus, the invention can be applied to or used with various types of connectors. Accordingly, one skilled on the art would understand that the specific shapes of the ferrule assembly components and plug housing interior can be modified in numerous ways, some of which are specifically set forth above. It is intended that this invention include such modifications and variations as come within the scope of the appended claims and their equivalents.

What is claimed is:

1. A fiber optic connector subassembly comprising:
   a plug housing having an inner surface that defines a cavity extending axially and a plug housing engaging surface therein, the plug housing defining a forward opening in communication with the cavity for receiving an optical fiber extending into a ferrule and defining a rearward opening in communication with the cavity, the rearward opening configured for the optical fiber and the ferrule to extend substantially axially, the plug housing engaging surface disposed proximate the rearward opening, the plug housing inner surface defining a key extending into the cavity, the key defining a height in a radial direction that decreases in a direction axially away from the rearward opening; and a ferrule holder configured to hold the ferrule and including a ferrule holder engaging surface engageable with the plug housing engaging surface, the ferrule holder having an outer surface defining an axial extending groove for slidably receiving the key so that the ferrule holder is increasingly radially movable relative to the plug housing inner surface as the ferrule holder moves relative to the plug housing in a direction axially away from the rearward opening, such that the connector subassembly provides radially floating alignment of the ferrule.

2. The connector subassembly of claim 1, wherein the plug housing engaging surface is substantially conical and defines a circular cross-section decreasing radially in a direction axially towards the rearward opening.

3. The connector subassembly of claim 2, wherein the ferrule holder engaging surface is substantially conical.

4. The connector subassembly of claim 1, wherein the ferrule holder defines a radially extending stop portion disposed proximate the ferrule holder engaging surface, and wherein the plug housing inner surface defines a complimentary stop portion, the groove extending axially across at least a portion of the ferrule holder stop portion.

5. The connector subassembly of claim 1, wherein the key has a cross-section including a generally rounded tip.

6. The connector subassembly of claim 1, wherein the key has a cross-section including a substantially rectangular sloped tip.

7. The connector subassembly of claim 1, wherein the groove has a generally flared cross-section.

8. The connector subassembly of claim 6, wherein the groove has a generally v-shaped cross-section.

9. The connector subassembly of claim 1, wherein the plug housing includes at least two keys disposed circumferentially about the plug housing inner surface, and wherein the ferrule holder includes at least two grooves disposed about the ferrule holder engaging surface, each of the grooves slidably receiving a respective one of the keys.

10. The connector subassembly of claim 9, wherein the at least two keys are disposed nonsymmetrically circumferentially about the plug housing inner surface.

11. The connector subassembly of claim 1, wherein the plug housing engaging surface includes a plug housing planar aligning section and the ferrule holder engaging surface includes a ferrule holder planar aligning section, the plug housing planar aligning section and the ferrule holder planer aligning section being engageable with each other.

12. The connector subassembly of claim 11, wherein the plug housing engaging surface includes at least two planar aligning sections and the ferrule holder engaging surface includes at least two planar aligning sections, each plug housing engaging surface planar aligning section being engageable with a respective one of the ferrule holder engaging surface planar aligning sections.

13. The connector subassembly of claim 1, further including a compression spring element disposed within the plug housing for urging the ferrule holder in a direction axially toward the rearward opening.

14. The connector subassembly of claim 1, wherein the plug housing includes at least two keys disposed circumferentially about the plug housing inner surface, and wherein the ferrule holder includes at least two grooves disposed about the ferrule holder, each of the grooves slidably receiving a respective one of the keys.

15. The connector subassembly of claim 14, wherein the at least two keys are disposed nonsymmetrically circumferentially about the plug housing inner surface.

16. A connector subassembly providing a floating alignment of a ferrule adapted to receive an optical fiber, the connector subassembly comprising:

a plug housing having an inner surface that defines a cavity extending axially and an engaging surface therein, the plug housing defining a forward opening in communication with the cavity for receiving the optical fiber and a rearward opening in communication with the cavity and through which the optical fiber and ferrule extend substantially axially, the engaging surface disposed proximate the rearward opening, the plug housing inner surface defining at least two plug housing orienting elements; and a ferrule holder configured to hold the ferrule and including a ferrule holder engaging surface engageable with the plug housing engaging surface, the ferrule holder engaging surface defining at least two plug housing orienting elements, the ferrule holder being increasingly radially movable relative to the plug housing inner surface as the ferrule holder moves relative to the plug housing in a direction axially away from the rearward opening, such that the connector subassembly provides radially floating alignment of the ferrule.

17. The connector subassembly of claim 16, wherein at least one of the plug housing orienting elements includes a key and at least one of the ferrule holder orienting elements includes a groove for slidably receiving the key.

18. The connector subassembly of claim 16, wherein at least one of the plug housing orienting elements includes a plug housing planar aligning section and at least one of the ferrule holder orienting elements includes a ferule housing planar aligning section engageable with one another.

19. A fiber optic connector comprising:

a plug housing having an inner surface that defines a cavity extending axially and a plug housing engaging surface therein, the plug housing defining a forward opening in communication with the cavity for receiving an optical fiber extending into a ferrule and defining a rearward opening in communication with the cavity, the rearward opening configured for the optical fiber and the ferrule to extend substantially axially, the plug housing engaging surface disposed proximate the rearward opening, the plug housing inner surface defining a key extending into the cavity, the key defining a height in a radial direction that decreases in a direction axially away from the rearward opening; and a ferrule holder configured to hold the ferrule and including a ferrule holder engaging surface engageable with the plug housing engaging surface, the ferrule holder having an outer surface defining an axial extending groove for slidably receiving the key so that the ferrule holder is increasingly radially movable relative to the plug housing inner surface as the ferrule holder moves relative to the plug housing in a direction axially away from the rearward opening, such that the connector subassembly provides radially floating alignment of the ferrule;

a spring element disposed within the plug housing and urging the ferrule holder in a direction axially toward the rearward opening;

a crimp body attached to the plug housing so as to compress the spring element; and a boot attached to the plug housing via the crimp body and disposed about a portion of the optical fiber.

20. The connector of claim 19, further including a tube disposed about a section of the optical fiber and secured to the ferrule holder.

* * * * *